United States Patent [19]

Girard et al.

[11] 4,264,681
[45] Apr. 28, 1981

[54] FIRE RESISTANT GLASS WINDOW

[75] Inventors: Philippe Girard, Evreux; Bernard Poisson, Nanterre, both of France

[73] Assignee: Saint Gobain Industries, Aubervilliers, France

[21] Appl. No.: 950,399

[22] Filed: Oct. 11, 1978

[30] Foreign Application Priority Data

Oct. 11, 1977 [FR] France .................................. 77 30505

[51] Int. Cl.³ ...................... B32B 17/10; C03C 27/12; C03C 27/10
[52] U.S. Cl. ........................................ 428/429; 156/99; 156/106; 156/329; 428/415; 428/432; 428/920; 428/921; 428/441; 428/442
[58] Field of Search ............... 428/428, 415, 442, 921, 428/429, 410, 432, 920, 34, 441, 426; 156/99, 106, 329

[56] References Cited

U.S. PATENT DOCUMENTS

| | | | |
|---|---|---|---|
| 3,177,170 | 4/1965 | Lund | 428/429 |
| 3,334,008 | 8/1967 | Park | 428/429 |
| 3,341,399 | 9/1967 | Hazdra | 428/429 |
| 3,634,169 | 1/1972 | Garnish | 428/415 X |
| 3,801,361 | 2/1974 | Kitaj | 428/429 |
| 3,801,423 | 4/1974 | Van Laethem et al. | 428/442 X |
| 3,894,024 | 7/1975 | Cherenko et al. | 156/99 |
| 3,900,686 | 8/1975 | Ammons | 428/425 |
| 4,020,217 | 4/1977 | Karasudani | 428/429 |
| 4,040,882 | 8/1977 | LeGrand | 156/106 |
| 4,059,469 | 11/1977 | Mattimoe et al. | 428/415 X |

FOREIGN PATENT DOCUMENTS

1503290 3/1978 United Kingdom .

*Primary Examiner*—Ellis P. Robinson
*Attorney, Agent, or Firm*—Pennie & Edmonds

[57] ABSTRACT

An improved process for making a multiple pane fire resistant window whose spacings are filled with an aqueous gel possessing multiple carbon bonds, wherein the improvement comprises placing a thin layer of an adherence agent on the contact surface of the panes, prior to placing the aqueous gel in the spacing. The adherence gel is selected from the group consisting essentially of organic titanates, organic zirconates, and silanes able to react with the aqueous gel's multiple carbon bonds.

13 Claims, 1 Drawing Figure

U.S. Patent     Apr. 28, 1981     4,264,681
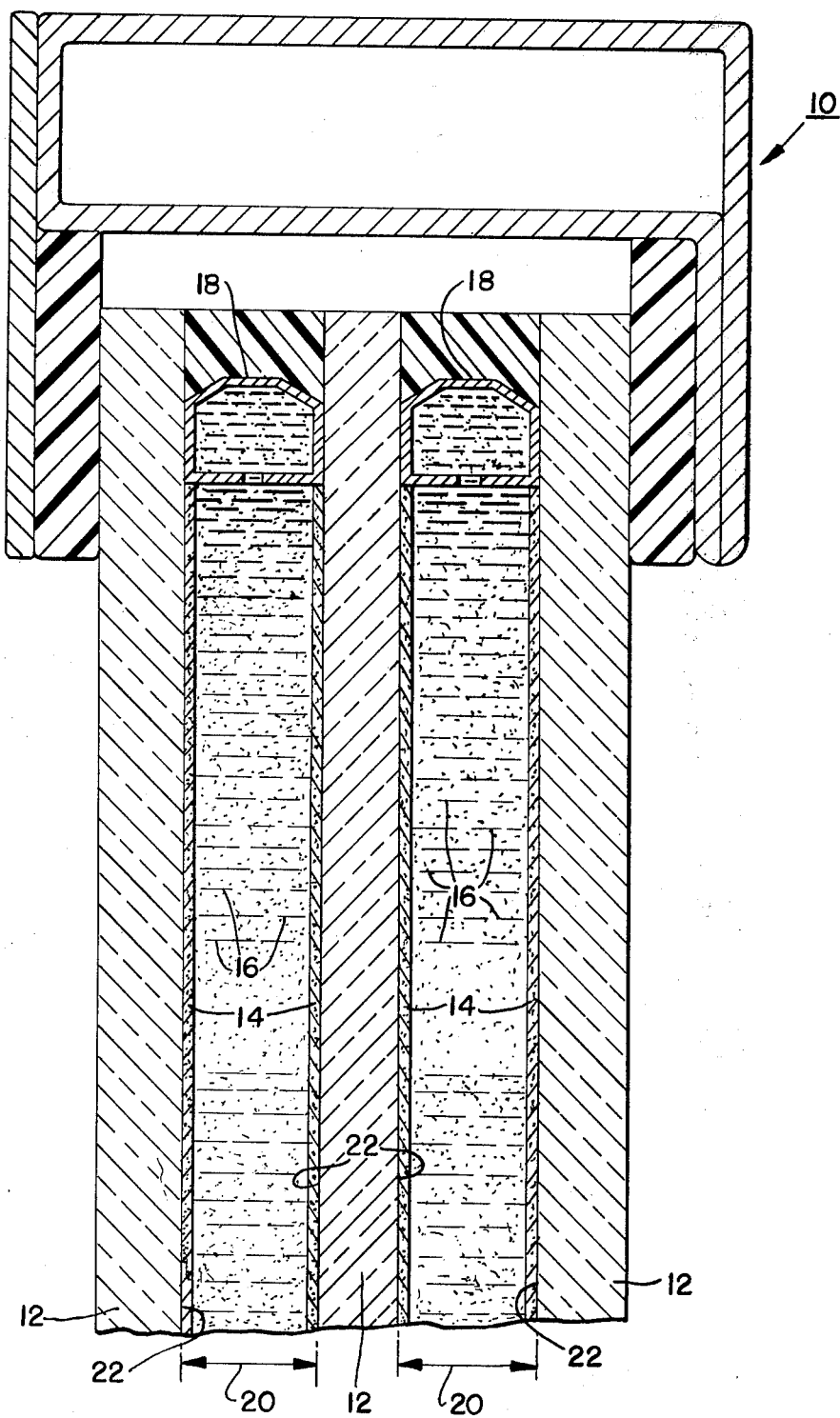

4,264,681

FIRE RESISTANT GLASS WINDOW

TECHNICAL FIELD

The present invention relates to fire resistant glass panes made of multiple sheets, preferably double sheets, whose free space between the glass sheets is filled with a polymerized organic gel comprising 65 to 95% by weight of a liquid exhibiting a high vaporization heat property.

BACKGROUND ART

Previous attempts have been made in the prior art to produce a fire-resisting glass window containing a liquid medium between fire resistant glass sheets. French application No. 76/09227, filed Mar. 30, 1976, by the applicant, proposed to produce such a fire resistant glass window by introducing into the free space an aqueous gel. The aqueous gel contained mineral salts able to produce an insulating foam under the effect of heat radiation. Thus, the gel polymerizes when exposed to fire, thereby producing an insulating foam. The addition of mineral salts, however, quickly resulted in a drop in the optical qualities of the fire resistant glass window, i.e., especially a drop in the transparency.

Another defect of multiple panes of fire resistant glass windows containing an aqueous gel between the glass sheets is the gel mobility or fluidity when the glass is subject to fire's extreme temperatures. In the case of fire, it has been found that the gel has a tendency to collapse, thereby forming relatively large aerated zones. Often the collapse continues until one large aerated zone is formed. Meanwhile, the panes exposed to the fire deform, break, and finally fall away from the door.

Additional considerations arise when a multiple pane fire resistant window is subject to repeated shock as in its role as the main element of a fireproof door. Door mounted aqueous film-multiple pane units are subject to bubbling after a certain number of jarring shocks. The bubbles can possess relatively large volumes and are immobile along the inside surfaces of the glass sheets. Thus, the aqueous film is detached from a glass sheet's inside face. The combination of the above traits results in an aqueous gel-multiple pane door which exhibits poor fireproofing properties.

The present invention discloses a fire resistant glass window which remedies the above inadequacies by significantly reducing the gel mobility via the addition of an adherence agent to the glass sheets' inside faces. The adherence agent's addition results in an aqueous gel which will not bubble when subjected to repeated jarring shocks and, therefore, exhibits improved fireproofing properties.

DISCLOSURE OF INVENTION

According to the present invention, an improved process of making multiple fireproof panes filled with an aqueous gel which exhibits multiple carbon bonds and has a titer of 65 to 95% water, results when the improvement comprises placing a thin layer of an adherence agent on the inside surfaces of the panes and thereby contacting the aqueous gel with the adherence agent. The multiple panes comprise at least two sheets of glass or vitrified products which are parallel to each other and are kept apart by any known means so as to form a fluid-tight space which is filled with the aqueous gel. The adherence agent comprises a thin layer of an organic compound selected from the group consisting essentially of: those members of the silane family which are able to react with the double or triple carbon bonds in the aqueous gel, organic titanates and organic zirconates. The adherence agent layer by bonding to the aqueous gel mass significantly reduces the bubbling effect when the aqueous gel-multiple pane fire resistant unit is subjected to jarring shock. Furthermore, the multiple pane unit continues to have good optical transmission due to the lack of bubbles on the gel-glass interface. Finally, even if one sheet of the multiple pane unit breaks and falls away from the unit itself, the gel will continue to act as fireproofing material over the total gel-glass interface despite the partial destruction of the multiple pane unit.

The silanes suitable for this invention are those comprising:

(1) at least a radical able to react on the SiOH and SiONa radicals of the glass, and
(2) at least another radical able to react with the multiple carbon bonds of the organic constituent of the aqueous gelled organic constituent.

These silanes act as anchoring bridges between the glass and the gel.

Titanates and zirconates are deposited in advance by any suitable means on the glass sheet faces which would ordinarily contact the aqueous gel. Additionally, the silanes can be mixed with a gel before it is placed in the space between two panes. Furthermore, the silanes can be deposited in a thin layer on the glass sheets' contact faces.

When the silane is deposited on the glass in advance of mounting a multiple pane unit, the amount deposited should correspond to a weight of one to five grams per square meter of glass. An excessive amount of silane can result in a multiple pane fire unit possessing unacceptable light transmission qualities. On the other hand, an inadequate amount of silane leads to insufficient anchoring of the gel on the glass sheet.

The qualities of the anchoring layer can also be improved by depositing a thin layer of organic zirconate or titanate on the glass contact face before the thin layer of silane is put in place.

Preferably, the thin layer of silane is formed from a mixture containing both the silane and a diluted, additional gel of the same family as one of the monomers contained in the aqueous gel. This procedure results in an increase in the number of anchoring sites between the silane and the organic constituents of the base gel. The increase occurs especially when the base gel is very aqueous. It should be noted that water or alcohol solvents can be employed in the dilution of the addition gel since these solvents wet the glass sheet contact face thereby assuring a sufficient spreading of the silane on the glass face. The desirability of these solvents is further appreciated in that they are both good diluents of silane and are economically desirable.

BRIEF DESCRIPTION OF THE DRAWING

The FIGURE of drawing illustrates a preferred embodiment of the fire resistant glass window of the present invention.

BEST MODE FOR CARRYING OUT THE INVENTION

As may be seen in the drawing, the fire resistant glass window is in the form of an aqueous gel-multiple pane unit 10 including panes 12 of glass or vitrified material supplied in a multiple of two or more panes with each pair of adjacent panes being separated by spaces 18. A representative unit, as illustrated, includes a plurality of three panes. A spacer is utilized between the panes of adjacent pairs with the spacers being located within the region of the upper extent and within the region of the lower extent (not shown) of each pane. The spacers provide a resultant spacing 20 between each adjacent pair of panes. An adherence agent layer 14 is coated on the opposed faces 22 of the panes and each of the spacings is filled with an aqueous gel 16.

The following examples present different alternative embodiments of the invention in a non-limitative means. These examples are separable into three categories:

(I) those relating to the gel adherence property;
(II) those relating to the gel adherence property after being subjected to jarring shocks; and
(III) gel adherence property upon subjection to fire.

GEL ADHERENCE PROPERTY

Since the quantity measurements of gel adherence are heterogeneous and random, the measurements achieved in the following examples are thoroughly qualitative. The test employed in these examples is set out hereinafter.

When the double pane unit has been installed, filled with aqueous gel and the latter polymerized, the two sheets of glass are removed simultaneously. The removal of the glass pane will shear separate the gel from either one or both of the sheets.

Adherence is measured as that percent of the total glass sheet surface area wherein the gel layer shears parallel to the plane of the glass sheet contact face. Shearing results in the gel remaining in contact with respective contact areas on both glass sheets. Additionally, the optical transmission of the multiple pane unit is checked by visible observation through an object through the multiple pane unit. If there is a slight optical disturbance of the object being looked at, the pane is said to exhibit an "optical alteration" wherein the defect cannot be more precisely measured and calculated by the usual methods of transmission measurement.

The multiple pane unit in these examples consists of two sheets of glass six millimeters apart. By suitable means, the space is filled with an aqueous gel. Except in Examples 3 and 4, the utilized sheets consist of floated fire-polished glass. Though the fire-polished glass sheets are six millimeters thick, the glass sheet thickness has no influence on the gel adherency.

The following examples are given to illustrate the best mode for carrying out the present invention, but are not to be construed as restricting the scope thereof.

STANDARD GEL COMPOSITION

| | |
|---|---|
| ROCAGIL 1295 of Rhone Poulenc | 15 parts by weight |
| DEAPN polymerization accelerator | 0.02 parts by weight |
| Polymerization catalysts: | |
| 5% aqueous solution of $Na_2S_2O_8$ | 7 parts by weight |
| Pure water | 78 parts by weight |

ROCAGIL 1295 of Rhone Poulenc is an aqueous solution of acrylic resin comprising a reticulating agent or not. DEAPN is diethylaminopropyl nitrile.

I. The first group of tests related to the adherence of the gel on sheets of glass of a multiple pane unit

EXAMPLE 1: Direct Deposit of Silane

The silane used to coat the glass sheets is an aminosilane known as A M E O, sold by Dynamit Nobel Company. The thin silane layer is deposited on the glass sheets with a pad by hand, by dipping, spraying, etc., and is spread on the glass sheets' contact faces at a rate of 1 to 5 g. per m.$^2$ of glass sheet.

After the thin silane layer has dried, and the glass sheets have been assembled, the aqueous gel is poured between the sheets. The gel is then polymerized, whereupon the aqueous gel-multiple pane unit is subjected to the adherence test. The adherence test samples have a surface of 20 cm.×25 cm. Adherence measurements were made in five tests and gave the following adherence percentages:

| Test | Adherence % |
|---|---|
| 1 | 100 |
| 2 | 100 |
| 3 | 40 |
| 4 | 100 |
| 5 | 100 |
| Average | 88 |

The samples showed a slight optical disturbance at the gel-glass interface.

By comparison, five control samples identical with the preceding ones, except the glass sheet contact faces, were not coated with silane, gave the following results:

| Test | Adherence % |
|---|---|
| 1 | 0 |
| 2 | 0 |
| 3 | 0 |
| 4 | 0 |
| 5 | 0 |

On these five control samples, the gel, subjected to a rupture action, came loose from both glass surfaces, leaving them perfectly clean and dry, i.e., the gel really did not stick to the glass at any point of the surface.

EXAMPLE 2

Example 2 is identical with Example 1 except that the silane is an epoxysilane: A 187 of the Union Carbide Company.

Adherence measurements were made in three tests and gave the following values:

| Test | Adherence % |
|---|---|
| 1 | 100 |
| 2 | 100 |
| 3 | 100 |

The test samples exhibited a good optical appearance.

The two following examples show that the invention applies to vitrified products other than this type of glass:

EXAMPLE 3

The sheets of vitrified products used in this example are ceramizable "mother glass" sheets, i.e., glass able to be transformed into a ceramized product by heat treatment, but not having undergone this treatment yet.

The faces of the double pane glass sheets intended to be in contact with the aqueous gel were previously coated with silane A 174 of Union Carbide Company, i.e., methacrylic silane. The aqueous gel introduced was the same as that used in Example 1.

The results of the adherence measurements shows a 100% adherence.

EXAMPLE 4

The sheets of vitrified products intended to constitute the double pane and used in this example are sheets whose inside faces were previously made reflective by pyrolysis of a metal compound into a thin oxide layer.

The silane deposited on this reflective layer of mineral oxide was the same silane as in Example 3.

Adherence measurements indicated a 95% adherence of the gel on the glass sheets.

EXAMPLE 5: Incorporation of the Silane in the Base Gel

In this example, again relative to multiple panes made up of floated glass sheets, the silane was preincorporated in the gel, in a proportion of 1% by weight.

The tests were made in two series:

First Series

The first series of tests were run with silane A M E O of the Dynamit Nobel Company, i.e., an aminosilane.

The adherence results were the following:

| Test | Adherence % |
|---|---|
| 1 | 75 |
| 2 | 85 |
| 3 | 80 |
| Average | 80 |

If the adherence is good, the test samples are only translucent. The multiple panes are not suitable as transparent glass but are suitable as a fireproof panel.

Second Series

The second series of tests was run with silane A 174 of the Union Carbide Company, i.e., a methacrylic silane.

| Test | Adherence % |
|---|---|
| 1 | 75 |
| 2 | 100 |
| 3 | 80 |
| Average | 83.33 |

The test samples had a slight optical trouble. This defect can be attenuated by reducing the proportion of silane without thereby reducing the adherence qualities.

EXAMPLE 6: Incorporation of Additional Gel

The adherence agent was deposited on the inside face of the glass sheets in the form of a solution with the following composition:

| | |
|---|---|
| Compound A 174 of Union Carbide | 5 parts by weight |
| ROCAGIL 1295 of Rhone Poulenc | 10 parts by weight |
| Ethanol | 85 parts by weight |

The solution was deposited in a proportion of 50 to 100 g. of solution per m² of glass on the faces of the glass sheets intended, after assembly, to constitute the inside faces of the double pane.

Adherence tests, in comparison with the tests without silane indicated in Example 1, showed the following results:

| Test | Adherence % |
|---|---|
| 1 | 100 |
| 2 | 100 |
| 3 | 100 |
| 4 | 100 |
| 5 | 100 |

The double panes did not show any optical alteration.

Examples 7-10 incorporate organic titanates or zirconates. The gel is the same as in the preceding examples.

EXAMPLE 7: Layers of Organic Titanates and Zirconates

The titanate deposited on the glass sheets was in a 5% solution by weight of butyltitanate, $Ti(OC_4H_9)_4$ in white spirit.

Two adherence tests were made, giving the following results:

| Test | Adherence % |
|---|---|
| 1 | 100 |
| 2 | 100 |

The panes exhibited a slight trouble.

In the three following examples, the glass sheets were first covered with an organic titanate or zirconate in solution in an organic solvent. After drying, this first layer was coated with a second layer of a silane in ethanol, incorporated in an aqueous gel identical with that introduced between the two glass sheets.

EXAMPLE 8: Double Layers

In the present example, a first layer of isopropyl alcohol containing 2% by weight of butyl titanate was deposited.

After evaporation of the solvent and drying of this layer, there was applied onto the butyl titanate a mixture comprising:

| | |
|---|---|
| Silane A 174 of Union Carbide | 5% by weight |
| ROCAGIL 1295 of Rhone Poulenc | 10% by weight |
| Ethanol | 10% by weight |

Adherence tests gave the following results:

| Test | Adherence % |
|---|---|
| 1 | 100 |
| 2 | 90 |
| 3 | 95 |
| Average | 95 |

EXAMPLE 9

This example resorts to a first layer of 2% n-propylate zirconate by weight in isopropyl alcohol.

After evaporation of the alcohol and drying of the zirconate, a second layer is applied by means of a mixture comprising:

| | |
|---|---|
| Silane A 174 of Union Carbide | 5% by weight |
| ROCAGIL 1295 of Rhone Poulenc | 10% by weight |
| Ethanol | 85% by weight |

Under the same conditions as in Example 6, adherence tests gave:

| Test | Adherence % |
|---|---|
| 1 | 100 |
| 2 | 100 |

EXAMPLE 10

The example is similar to Example 9. The second layer, however, is achieved by means of a vinyl silane, V T M O E O, of Dynamit Nobel in a mixture comprising:

| | |
|---|---|
| V T M O E O | 5% by weight |
| ROCAGIL 1295 of Rhone Poulenc | 10% by weight |
| Ethanol | 85% by weight |

Adherence tests gave:

| Test | Adherence % |
|---|---|
| 1 | 100 |
| 2 | 70 |
| Average | 85 |

GELS WITH INCORPORATION OF SALTS

The following examples deal with various salt added to aqueous gels.

It is known that multiple fireproof panes comprising an aqueous gel have their fire resistance improved if there are incorporated in the gel certain salts capable of forming either a foam or an opaque white crystallized salt layer when subjected to fire. The opaque salt layer results from the precipitation of the salt as a result of evaporation of water.

Solvated salts at times exhibit either considerable basicity or acidity. If these base or acid solutions are compatible with the layers of organic titanates or zirconates, it could be feared that such pH's would disturb the makeup of the silane layers and reduce thereby their power of anchoring the aqueous gel onto the glass. The following examples show that this is not the case. Examples 11 to 16 relate to potassium phosphate.

EXAMPLE 11: Potassium Phosphate

In this example the silane deposited by spray gun onto the glass sheets is A 174 of Union Carbide, of which 10 parts by weight are mixed in 90 parts by weight of ethanol.

The aqueous gel introduced between the two sheets of glass of the double pane is ROCAGIL 1295 of Rhone Poulenc already cited, to which has been added potassium phosphate, the composition of the mixture being:

| | |
|---|---|
| ROCAGIL 1295 of Rhone Poulenc | 15 parts by weight |
| Potassium phosphate | 15 parts by weight |
| DEAPN (accelerator) | 0.05 parts by weight |
| $Na_2S_2O_8$ at 5% in water (catalyst) | 10 parts by weight |
| Water | 60 parts by weight |

The samples have a surface of 20 cm. $\times$ 25 cm. or 500 cm.$^2$.

On the control samples not treated with silane, organic zirconates or titanates, the adherence of the gel to the glass is zero:

| Test | Adherence % |
|---|---|
| 1 | 0 |
| 2 | 0 |
| 3 | 0 |
| 4 | 0 |
| 5 | 0 |

Three double panes previously treated as described above with an alcohol solution of silane gave:

| Test | Adherence % |
|---|---|
| 1 | 100 |
| 2 | 100 |
| 3 | 97 |
| Average | 99 |

(The test samples showed a slight disturbance at the aqueous gel-glass interface.)

EXAMPLE 12

This example differs from Example 11 only by a slighter content of silane solution. It was desired to see if a lower silane content would result in the disappearance of the disturbance while retaining sufficient adherence.

The alcohol solution of silane A 174 comprises:

| | |
|---|---|
| Silane A 174 | 5 parts by weight |
| Ethanol | 95 parts by weight |

The results were:

| Test | Adherence % |
|---|---|
| 1 | 92 |
| 2 | 75 |
| 3 | 97 |
| Average | 88 |

The double panes are perfectly transparent.

EXAMPLE 13

If the content of silane in ethanol is lowered still more, the adherence, although retaining a notable value, is, nevertheless, clearly lowered at the risk of becoming insufficient.

The content of silane in ethanol is as follows:

| | |
|---|---|
| Silane A 174 | 2.5 parts by weight |
| Ethanol | 97.5 parts by weight |

| Test | Adherence % |
|---|---|
| 1 | 70 |
| 2 | 35 |
| 3 | 80 |
| Average | 61.6 |

(The double panes are perfectly transparent.)

EXAMPLE 14

This example shows that by using the Example 13 silane solution and an aqueous gel monomer additive, the transparent qualities are retained while the gel adherence qualities are increased. In fact, the gel adherency is improved in relation to Example 11 for which the concentration of silane in ethanol was 10 parts by weight per 90 parts by weight of ethanol.

In this example, the silane solution comprises:

| Silane A 174 | 2.5 parts by weight |
|---|---|
| ROCAGIL 1295 of Rhone Poulenc | 10 parts by weight |
| Ethanol | 87.5 parts by weight |

The tests yielded:

| Test | Adherence % |
|---|---|
| 1 | 100 |
| 2 | 100 |
| 3 | 100 |

The double panes are perfectly transparent.

Examples 13 and 14 disclose that if a solution of 2.5 parts by weight of silane in 97.5 parts by weight of ethanol leads to an insufficient adherence value of the gel, addition of the organic compound of the gel (10 parts by weight of ROCAGIL) to the silane solution raises the adherence values to excellent levels.

EXAMPLE 15

Comparative tests were made between vinyl silane and a methacrylic silane in an ethanolic monomer-silane solution. The gel composition employed below is set forth in Example 11.

The adherence tests gave results of the same order of magnitude. In both cases, the double panes were perfectly transparent.

| Series 15A | |
|---|---|
| Silane A 174 | 5 parts by weight |
| ROCAGIL 1295 of Rhone Poulenc | 10 parts by weight |
| Ethanol | 85 parts by weight |

| Test | Adherence % |
|---|---|
| 1 | 100 |
| 2 | 100 |
| 3 | 100 |
| 4 | 100 |
| 5 | 100 |

(Very good transparency.)

| Series 15B | |
|---|---|
| Silane V T M O E O | 5 parts by weight |
| ROCAGIL 1295 of Rhone Poulenc | 10 parts by weight |
| Ethanol | 85 parts by weight |

| Test | Adherence % |
|---|---|
| 1 | 82 |
| 2 | 100 |
| 3 | 100 |
| 4 | 90 |
| 5 | 97 |
| Average | 93.8 |

(Very good transparency.)

The following examples are similar to Examples 11 to 15. The mineral salt introduced in the aqueous gel, however, is sodium metaphosphate.

The composition of the gel is the following:

| ROCAGIL 1295 of Rhone Poulenc | 15 parts by weight |
|---|---|
| Sodium metaphosphate | 10 parts by weight |
| DEAPN | 0.1 parts by weight |
| $(NH_4)_2S_2O_8$ at 5% in water | 5 parts by weight |
| NaOH at 10% | 2.5 parts by weight |
| Water sufficient for | 100 parts by weight |

Here again the results show that the presence of such a salt is perfectly compatible with the formation of a silane layer covering the glass to improve the adherence of the gel.

The first three examples were made without addition of ROCAGIL to the silane with decreasing concentrations of silane.

EXAMPLE 16: Sodium Metaphosphate

The solution of silane A 174 is at 10 parts by weight and 90 parts by weight of ethanol.

The results are:

| Test | Adherence % |
|---|---|
| 1 | 100 |
| 2 | 100 |
| 3 | 100 |

(Slight trouble with some white points.)

EXAMPLE 17

This example is the same as Example 16 but the content of silane A 174 is lowered to 5 parts by weight per 95 parts of ethanol.

The results are:

| Test | Adherence % |
|---|---|
| 1 | 92 |
| 2 | 90 |
| 3 | 90 |

(Very good transparency.)

EXAMPLE 18

In this example, the content of silane A 174 was lowered to 2.5 parts by weight per 97.5 parts by weight of ethanol.

The results are:

| Test | Adherence % |
|---|---|
| 1 | 60 |
| 2 | 60 |
| 3 | 55 |

(Very good transparency.)

EXAMPLE 19

In the present example, the silane solution is the same as that of Example 15A, namely:

| | |
|---|---|
| Methacrylic silane A 174 | 5 parts by weight |
| ROCAGIL 1295 of Rhone Poulenc | 10 parts by weight |
| Ethanol | 85 parts by weight |

Tests with silane yielded:

| Test | Adherence % |
|---|---|
| 1 | 100 |
| 2 | 100 |
| 3 | 100 |

(Good transparency.)

In the control tests without silane adherency agent, the gel showed no adherence to the glass.

EXAMPLE 20: Sodium Chloride

This example shows that the adherence qualities brought by the silane are not lowered when the aqueous gel contains sodium chloride.

The composition of the gel is:

| | |
|---|---|
| ROCAGIL 1295 of Rhone Poulenc | 15 parts by weight |
| Sodium chloride | 15 parts by weight |
| DEAPN | 0.05 parts by weight |
| $Na_2S_2O_8$ at 5% in water | 5 parts by weight |
| Water | 65 parts by weight |

The silane solution contains 5 parts by weight of methacrylic silane A 174 and 95 parts ethanol.

The control tests without silane gave:

| Test | Adherence % |
|---|---|
| 1 | 0 |
| 2 | 0 |
| 3 | 0 |

The control tests with silane yielded:

| Test | Adherence % |
|---|---|
| 1 | 100 |
| 2 | 100 |
| 3 | 100 |

EXAMPLE 21: Lithium Chloride

This example is identical with Example 20 with the exception of the sodium chloride introduced into the aqueous gel which has been replaced with lithium chloride.

A single adherence test of the gel was run.

It gave 100% adherence. The double pane exhibited a good transparency.

EXAMPLE 22: Sodium Silicate

In this example, the gel contains sodium silicate, a mineral salt foaming under the effect of the heat of a fire.

The composition of the gel is:

| | |
|---|---|
| ROCAGIL 1295 of Rhone Poulenc | 25 parts by weight |
| DEAPN | 0.1 parts by weight |
| $Na_2SiO_3$ at 30% in water | 10 parts by weight |
| $Na_2S_2O_8$ at 5% in water | 5 parts by weight |
| Water | 60 parts by weight |

On floated glass sheets not coated with an adherence product, the tests yielded:

| Test | Adherence % |
|---|---|
| 1 | 0 |
| 2 | 0 |
| 3 | 0 |

On glass sheets coated with a layer of silane A 174 obtained from a 5% silane solution in ethanol the tests yielded:

| Test | Adherence % |
|---|---|
| 1 | 100 |
| 2 | 100 |
| 3 | 100 |

II. The second group of tests are related to the adherence of the gel on sheets of glass of a multiple pane unit subjected to aging or to vibrations.

The vibrations are essentially due to repeated openings and closings of the door, the vibrations, moreover, having a repercussion on the impost or frame which can themselves be made up of multiple panes.

The tests were made with two sheets of untempered glass 97 cm. long and 41 cm. wide. The thickness of the sheets was 6 mm. Spacing of the sheets, i.e., the thickness of the gel introduced later between the sheets, was 22 mm.

In all cases, the gel introduced was ROCAGIL 1295 of Rhone Poulenc.

To the gel are added mineral salts selected from one of those already cited in the preceding examples, or other salts. Also, an accelerator, DEAPN, and a polymerization catalyst, a 5% persulfate in water solution, is added.

AGING:

Numerous double panes were made without depositing of layers of zirconates, titanates, or silanes on the inside faces of the sheets. In all these tests, there was quickly observed some days after making of the double pane filled with gel, the appearance of air bubbles with a more or less large surface. These large bubbles moved gently to the gel-glass interfaces and had a general tendency to move upward toward the top of the double pane.

These bubbles were caused either by an incomplete filling of the space between the glass sheets (bubbles wedged during filling of the gel in the angles of the spacing sections of the sheets) or by suction caused by the shrinkage of the gel, a shrinkage due to a variation of the temperature of the double pane.

This defect due to the bubbles has two important drawbacks:

(a) optical defect (b) adherence defect of the gel during a fire and breaking of the glass sheet exposed to the fire, a defect that causes a premature breakdown of the gel especially when the dimensions of the fireproof panes are large.

EXAMPLE 23: Vibrations

This example was made with a gel containing potassium phosphate. The composition of the gel introduced into the double pane is that indicated in Example 11.

Test No. 1:

As a control, the inside faces of the double pane were not covered with organic titanate, zirconate or silane.

The panes were subjected to the banging effect immediately after polymerization of the gel. During filling, the double pane exhibited only very slight bubbles enclosed.

After 400 bangings, there appeared a separation of the gel from the glass sheets. Numerous bubbles appeared which moved slowly. The optical defects in the unit were considerable.

Test No. 2:

The inside faces of the glass sheets were coated with a layer of silane A 174 (methacrylic silane) of Union Carbide in solution in ethanol (5 parts by weight of A 174 and 90 parts by weight of ethanol).

The double pane resisted 16,000 bangings before the defects as in Test No. 1 appeared. Appearance of these defects is preceded by a cleavage of the gel.

EXAMPLE 24

The gel introduced contains a sodium metaphosphate. Its composition is that indicated in Example 16.

Test No. 1:

In this test, the inside faces of the glass sheet did not comprise a layer of organic zirconate, titanate or silane.

After three days' storage, the double pane showed separations of the gel at the gel-glass sheet interface. The panes could not even be mounted to undergo the banging test.

Test No. 2:

The inside faces of the glass sheets of the double pane were covered with a solution of silane A 174 (5%) in ethanol (95%).

After 200,000 bangings, the double pane showed neither bubbles nor cleavage nor separation of the gel at the gel-glass sheet interface. The panes were considered optically correct and able to undergo the fire test. Only some separations at the level of the gel-metal section bond were noted.

Test No. 3:

This test, for which the double pane was the same as that of Test No. 2, gave identical results. No defect was observed in the panes after 200,000 bangings.

EXAMPLE 25

In this example, the gel contains lithium chloride. The composition is that indicated in Example 21.

Test No. 1:

In this test the faces of the glass sheets in contact with the gel were not covered with either organic titanate, zirconate or silane. After several days of aging, separations of the gel appeared, thus precluding shock tests.

Test No. 2:

The glass sheet contact surfaces were covered with a layer of silane A 174 of Union Carbide in solution in ethanol and containing a fraction of the organic polymer of the gel. The composition of the mixture, deposited by spray gun, was:

| | |
|---|---|
| Silane A 174 | 5 parts by weight |
| ROCAGIL 1295 of Rhone Poulenc | 10 parts by weight |
| Ethanol | 85 parts by weight |

Starting with 107,000 bangings, there were observed some bubbles along the metal sections and several cm.$^2$ of cleavage (in the mass of the gel) along the vertical section opposite the hinges. After 200,000 bangings, the defects had slightly increased, but almost all these defects were hidden by the frame that held the panes in the door.

III. FIRE RESISTANCE

Fire resistance tests were made with double panes comprising:
(1) a DRAVEL glass sheet 7 mm. thick, i.e., not tempered but reinforced with a steel wire grid on the fire sheet side; and
(2) a sheet of tempered glass 6 mm. thick.

The fire behavior test was performed according to German standard DIN No. 4102. If the inside faces of the glass sheets are not covered with an anchoring layer of organic zirconate or titanate or silane, the gel mass floats between the two sheets when the Dravel glass sheet is broken. Under the effect of its own weight, this mass begins to separate from the upper edge of the frame between the double panes. The larger the pane dimensions, the more rapid is the separation. Finally, the gel mass separates from the entire surface of the tempered glass sheet and collapses.

On the other hand, when the glass sheet contact faces are coated with a silane layer, the sheet breaks but the gel does not collapse. A film of gel continues to adhere to the broken glass sheet while the entire remaining gel mass adheres to the glass sheet on the side opposite the fire.

EXAMPLE 26: Incorporation of Base Gel

This example comprises several tests in which the glass sheets do not receive a layer of organic titanate, zirconate or silane beforehand.

Test No. 1:

In the first test, the double pane was filled with a gel of the following composition:

| | |
|---|---|
| ROCAGIL 1295 of Rhone Poulenc | 12.5 parts by weight |
| DEAPN | 0.15 parts by weight |
| Na$_2$S$_2$O$_8$ at 5% | 4 parts by weight |
| Water sufficient for | 100 parts by weight |

Its dimensions were 41 cm. × 41 cm.

The spacing between the two glass sheets was 36 mm.

According to German Standard DIN 4102, a double pane placed in an oven door is exposed for 57 minutes.

Test No. 2:

The second test related to a series of double panes not comprising a layer of organic titanate, zirconate or silanes, but wherein a mineral salt was added to ROCAGIL gel. The salt is able, by evaporation of the water in fire, either to crystallize giving a deposit of white salt or give a foam forming a protective screen between the fire and the remainder of the gel and the sheet of the double pane on the side away from the fire. The second test, therefore, relates to different double panes whose gel thickness and contents of ROCAGIL or mineral salt introduced vary from one pane to the next. The results are summarized in the following table:

| Gel Composition | Thickness of Gel (mm) | "Fireproof" Time According to German Standard DIN 4102 (Minutes) |
|---|---|---|
| 15 parts by weight of ROCAGIL 1295 11 parts by weight of 30% sodium silicate Water sufficient for 100 | 24 | 45 |
| 15 parts by weight ROCAGIL 15 parts by weight 30% sodium silicate Water sufficient for 100 | 36 | 58 |
| 25 parts by weight ROCAGIL 15 parts by weight 30% sodium silicate Water sufficient for 100 | 24 | 54 |
| 25 parts by weight ROCAGIL 10 parts by weight 30% sodium silicate Water sufficient for 100 | 24 | 45 |
| 15 parts by weight ROCAGIL 15 parts by weight lithium chloride Water sufficient for 100 | 32 | 76 |
| 15 parts by weight ROCAGIL 15 parts by weight lithium chloride Water sufficient for 100 | 22 | 45 |
| 15 parts by weight ROCAGIL 15 parts by weight sodium phoshate Water sufficient for 100 | 22 | 39 |

EXAMPLE 27: Layer Deposited Beforehand

This example discloses a considerable increase in the period of fire resistance, the fireproof time, according to DIN. The glass sheet contact faces are coated with a layer for anchoring the gel onto the glass.

In this example, the silane layer was obtained by spraying with a gun a solution of:

| Methacrylic silane A 174 of Union Carbide | 5 parts by weight |
|---|---|
| Acrylamide resin gel: ROCAGIL 1295 of Rhone Poulenc | 10 parts by weight |
| Ethanol | 85 parts by weight |

The layer comprises 1 to 5 g. of silane per m² of glass.
In this example, the two series of tests simultaneously reveal:
(1) the much longer fire resistant period of smaller dimensioned double pane fire resistant units as compared to those of larger dimensions, and
(2) the increase of the fire resistant period when the double pane unit is filled with a gel that adheres even during a fire in comparison with a double pane wherein no adherency agent is added.

Test No. 1:
Double pane without silane layer. Composition of Gel:

| ROCAGIL 1295 of Rhone Poulenc | 15 parts by weight |
|---|---|
| Sodium orthophosphate | 15 parts by weight |
| DEAPN | 0.1 parts by weight |
| $(NH_4)_2S_2O_8$ at 5% in water | 5 parts by weight |
| Water sufficient for | 100 parts by weight |

| | Fireproof Time |
|---|---|
| Pane 41 × 41 cm. | 82 min. |
| Pane 110 × 130 cm. | 30 min. |

Test No. 2:
Double pane with Layer of Methacrylic Silane A 174.
Composition of Gel:

| ROCAGIL 1295 of Rhone Poulenc | 15 parts by weight |
|---|---|
| K phosphate | 15 parts by weight |
| DEAPN | 0.05 parts by weight |
| $Na_2S_2O_8$ at 5% in water | 10 parts by weight |
| Water sufficient for | 100 parts by weight |

| | Fireproof Time |
|---|---|
| Pane 41 × 41 cm. | 105 min. |
| Pane 110 × 130 cm. | 72 min. |

The various above examples disclose the improvement of the aqueous gel adherency multipane glass sheets. Consequently, there are resulting improvements on the shock resistance when mounted in a door and on the "fireproof" quality, i.e., a fire-resistant holding period measured by German Standard DIN No. 4102.

While the invention has been described in connection with the preferred embodiments, it is not intended to limit the invention to the particular forms set forth, but, on the contrary, it is intended to cover such alternatives, modifications, and equivalents as may be included within the spirit and scope of the invention as defined by the appended claims.

We claim:

1. An improved process for making multiple glass pane fire resistant units including a spacing therebetween which spacings are filled with an aqueous 65 to 95% titer gel possessing double or triple carbon bonds, the process including the step of polymerizing the gel, wherein the improvement comprises:
   (a) placing a layer of an adherence agent on the opposing contact surface of each of the glass panes; and
   (b) adding an aqueous gel in the spacing thereby contacting the adherence agent with the added aqueous gel to provide anchoring bridges between said contact surfaces and aqueous gel,
and wherein the adherence agent is selected from the group consisting essentially of organic titanates, organic zirconates and silanes able to react with the double or triple carbon bonds of the gel.

2. An improved process as recited in claim 1 wherein the adherence agent is deposited in a layer on the contact surface of each pane before the panes are assembled.

3. An improved process as recited in claim 1 wherein the adherence agent contains a silane comprising:
   (1) at least a radical able to react on the SiOH and SiONa radicals of the glass; and
   (2) at least another radical able to react with the double or triple bonds of the gel.

4. An improved process as recited in claim 3 wherein the silane is selected from the group consisting essentially of acrylic silanes, vinyl silanes, amino silanes and epoxy silanes.

5. An improved process as recited in claims 1, 2, 3 or 4 wherein the aqueous gel is an acrylic gel.

6. An improved process as recited in claims 1, 3 or 4 wherein:
   (1) the silane is deposited on the opposing contact surface of each pane in the form of a mixture with an aqueous solution of a gel of the same family as a monomer contained in the gel added to the spacing.

7. An improved process as recited in claim 6 wherein the silane mixture is diluted with a polar solvent.

8. An improved process as recited in claim 7 wherein the polar solvent is selected from the group consisting essentially of lower alkanols or water.

9. An improved process as recited in claim 1, 2, 3, 4, 7, or 8 wherein there is successively deposited on the opposing contact surface of each pane:
   (1) a thin layer of a compound selected from the group consisting essentially of organic titanate or organic zirconate; and
   (2) a thin silane layer.

10. Improved multiple glass pane fire resistant windows produced by the process defined in claims 1, 2, 3 or 8.

11. Improved multiple glass pane fire resistant windows produced by the process defined in claim 5.

12. Improved multiple glass pane fire resistant windows produced by the process defined in claim 6.

13. Improved multiple glass pane fire resistant windows produced by the process defined in claim 9.

* * * * *

UNITED STATES PATENT AND TRADEMARK OFFICE
CERTIFICATE OF CORRECTION

PATENT NO. : 4,264,681
DATED : April 28, 1981
INVENTOR(S) : Philippe Girard and Bernard Poisson It is certified that error appears in the above-identified patent and that said Letters Patent are hereby corrected as shown below:

Column 18, lines 9 and 10, "claims 1, 2, 3 or 8." should be -- claims 1, 2, 3, 4, 7 or 8. --.

Signed and Sealed this

Twenty-fifth Day of August 1981

[SEAL]

Attest:

GERALD J. MOSSINGHOFF

Attesting Officer

Commissioner of Patents and Trademarks